United States Patent
Koreeda et al.

(10) Patent No.: US 8,419,295 B2
(45) Date of Patent: Apr. 16, 2013

(54) PHOTOELECTRIC CONVERSION/CONNECTION DEVICE

(75) Inventors: Yuichi Koreeda, Tokyo (JP); Wataru Ohtsu, Tokyo (JP); Mikio Oda, Tokyo (JP); Hisaya Takahashi, Tokyo (JP); Takashi Ohtsuka, Tokyo (JP); Hikaru Kouta, Tokyo (JP); Hideyuki Ono, Tokyo (JP)

(73) Assignees: Japan Aviation Electronics Industry, Limited, Tokyo (JP); NEC Corporation, Tokyo (JP)

( * ) Notice: Subject to any disclaimer, the term of this patent is extended or adjusted under 35 U.S.C. 154(b) by 392 days.

(21) Appl. No.: 12/449,174

(22) PCT Filed: Jan. 21, 2008

(86) PCT No.: PCT/JP2008/050677
§ 371 (c)(1),
(2), (4) Date: Oct. 15, 2009

(87) PCT Pub. No.: WO2008/090833
PCT Pub. Date: Jul. 31, 2008

(65) Prior Publication Data
US 2010/0098383 A1    Apr. 22, 2010

(30) Foreign Application Priority Data

Jan. 26, 2007   (JP) ................... 2007-016599

(51) Int. Cl.
*G02B 6/36*  (2006.01)
(52) U.S. Cl.
USPC ......................................................... 385/88

(58) Field of Classification Search ............... 385/88–94
See application file for complete search history.

(56) References Cited

U.S. PATENT DOCUMENTS

| | | | | |
|---|---|---|---|---|
| 4,268,113 | A * | 5/1981 | Noel, Jr. ...................... | 385/92 |
| 6,771,860 | B2 * | 8/2004 | Trezza et al. .................. | 385/52 |
| 7,065,275 | B2 | 6/2006 | Miyamae | |
| 7,350,983 | B2 * | 4/2008 | Saitoh et al. .................. | 385/88 |
| 8,090,228 | B2 * | 1/2012 | Nobuhara ..................... | 385/14 |
| 2005/0008302 | A1 * | 1/2005 | Miyamae ..................... | 385/88 |
| 2005/0201666 | A1 | 9/2005 | Terada et al. | |
| 2005/0259927 | A1 * | 11/2005 | Kato ............................ | 385/93 |

FOREIGN PATENT DOCUMENTS

| | | |
|---|---|---|
| EP | 0 635 741 | 11/2002 |
| GB | 2 297 007 | 7/1996 |

(Continued)

OTHER PUBLICATIONS

International Search Report.

*Primary Examiner* — Sarah Hahm
(74) *Attorney, Agent, or Firm* — Collard & Roe, P.C.

(57) ABSTRACT

In a photoelectric conversion/connection device (100) including an optical element (320), a mounting board (310) on which the optical element is mounted, and an optical connector (400) which is connected to the mounting board so as to be optically connected to the optical element, the optical connector (400) is arranged on a surface (310a) opposite to a mounting surface (310b) of the mounting board (310) and the optical element (320) is exposed. The photoelectric conversion/connection device (100) includes a motherboard (210) having a main surface (210a) and an electric connector (220) to be mounted on the main surface of the motherboard. The electric connector (220) is detachably connected to the mounting board (310).

11 Claims, 9 Drawing Sheets

FOREIGN PATENT DOCUMENTS

| | | |
|---|---|---|
| JP | 5-102681 | 4/1993 |
| JP | 7-72355 | 3/1995 |
| JP | 2000-40562 | 2/2000 |
| JP | 2005-10435 | 1/2005 |
| JP | 3772163 | 2/2005 |
| JP | 2005-257879 | 9/2005 |

\* cited by examiner

PHOTOELECTRIC CONVERSION/CONNECTION DEVICE

CROSS REFERENCE TO RELATED APPLICATIONS

This application is the National Stage of PCT/JP2008/050677 filed on Jan. 21, 2008, which claims priority under 35 U.S.C. §119 of Japanese Application No. 2007-016599 filed on Jan. 26, 2007. The international application under PCT article 21(2) was not published in English.

TECHNICAL FIELD

This invention relates to a photoelectric conversion/connection device.

BACKGROUND ART

There have conventionally been proposed various devices that connect together an optical part adapted to transmit an optical signal and an electrical part adapted to transmit an electrical signal, while performing conversion between an optical signal and an electrical signal. Such a device is called a "photoelectric conversion/connection device" herein.

As one example of a photoelectric conversion/connection device, there is known, for example, an "optical module" which is small in size and low in cost by reducing the number of components of the optical module (see, e.g. Patent Document 1). The optical module disclosed in Patent Document 1 comprises an optical element that performs photoelectric conversion, such as a light-emitting element such as a laser diode (LD) or a light-receiving element such as a photodiode (PD), and a subcarrier (sub-board) mounted with the optical element thereon. On the optical element mounting surface side of the subcarrier (sub-board), there is provided a ferrule (optical connector) protecting an optical fiber serving as an optical transmission medium. A recess (optical element receiving recess) large enough to accommodate the optical element therein is formed on one side wall surface (end face) of the ferrule (optical connector). A transparent resin is filled into this recess. The optical fiber and the optical element are optically coupled to each other. The ferrule (optical connector) is formed with electrical wiring (terminals) and is connected to a Pt board (motherboard) through this electrical wiring (terminals). A driver circuit for driving the optical element and so on are mounted on the Pt board. Patent Document 1 also discloses an example in which, instead of a subcarrier, a ferrule is provided with electrical wiring and an optical element is sealed with a sealing resin. Also in this case, a transparent resin is filled into a gap between the optical element and the ferrule.

As another example of a photoelectric conversion/connection device, there is known a "connector-type optical module" that can achieve a reduction in thickness and improvement in reliability by adding an improvement to an optical module of the type in which an optical semiconductor element and an optical connector are directly brought into contact with each other (see, e.g. Patent Document 2). The connector-type optical module disclosed in Patent Document 2 comprises an optical semiconductor element (optical element), a mounting board mounted with the optical semiconductor element thereon, and an optical connector provided on the optical semiconductor element mounting surface side of the mounting board. The optical connector holds an optical fiber while positioning it and is attached to the mounting board while being mechanically positioned. The mounting board is formed with a guide hole and the optical connector is provided with a guide pin.

As still another example of a photoelectric conversion/connection device, there is disclosed a "photoelectric interface" which is high in cost efficiency, simple in structure, and matchable even in a mass-production system (see, e.g. Patent Document 3). The photoelectric interface disclosed in Patent Document 3 comprises a photoelectric element including an optical element (optical element) and an interconnecting board (mounting board) mounted with the optical element thereon, and an optical connector (optical connector) provided on the optical element mounting surface side of the photoelectric element. The optical connector includes an optical fiber and comprises a plurality of projection-shaped matching devices. The photoelectric element has recess-shaped matching devices that engage with the plurality of projection-shaped matching devices.

Patent Document 1: JP-A-2005-257879
Patent Document 2: JP-B-3772163
Patent Document 3: JP-A-H7-72355

DISCLOSURE OF THE INVENTION

Problem to be Solved by the Invention

In the optical module disclosed in Patent Document 1, the subcarrier (optical element mounting board) mounted with the optical element thereon is directly attached to the end face of the ferrule (optical connector). Alternatively, the optical element is directly resin-sealed at the end face of the ferrule (optical connector). Therefore, the optical element is confined between the end face of the ferrule (optical connector) and the subcarrier or the sealing resin. As a result, it is quite difficult to ensure a heat dissipation measure for the optical element in use (operation). Further, when the optical element or the ferrule (optical connector) is degraded, it is not possible to replace the optical element or the ferrule (optical connector).

On the other hand, the connector-type optical module disclosed in Patent Document 2 has a structure in which the mounting board mounted with the optical element thereon and the optical connector can be separated from each other, and therefore, when both are degraded, both can be replaced. However, in the connector-type optical module disclosed in Patent Document 2, like in the case of Patent Document 1, inasmuch as the optical connector is provided on the optical element mounting surface side of the mounting board, the optical element is confined during use (operation) and thus it is difficult to take a heat dissipation measure for the optical element in use (operation).

The photoelectric interface disclosed in Patent Document 3 has a structure in which, like in Patent Document 2, the optical connector (optical connector) and the photoelectric element can be separated from each other, and therefore, both can be replaced. However, in the photoelectric interface disclosed in Patent Document 3, like in Patent Document 1 and Patent Document 2, inasmuch as the optical connector (optical connector) is provided on the optical element mounting surface side of the interconnecting board (mounting board), the optical element is confined during use (operation) and thus it is difficult to take a heat dissipation measure for the optical element in use (operation).

At any rate, Patent Documents 1 to 3 each teach the structure in which the optical connector is provided on the optical element mounting surface side of the mounting board (sub-board) and thus the optical element is confined. Generally, the board is made of a ceramic or resin material. The ceramic and the resin are both poor in thermal conductivity. Therefore, with the photoelectric conversion/connection devices disclosed in Patent Documents 1 to 3, there is a problem that it is not possible to sufficiently ensure a heat dissipation measure for the optical element that generates heat by being driven.

Further, in Patent Document 1, the terminals for electrical connection to the Pt board (motherboard) are necessary on a side surface of the ferrule (optical connector) and it is not possible to attach or detach the optical element mounting board (sub-board) with respect to the Pt board (motherboard).

It is therefore an object of this invention to provide a photoelectric conversion/connection device that can sufficiently ensure a heat dissipation measure for an optical element.

It is another object of this invention to provide a photoelectric conversion/connection device in which a mounting board is easily attachable and detachable with respect to a motherboard.

Means for Solving the Problem

A photoelectric conversion/connection device according to this invention comprises an optical element, a mounting board mounted with the optical element thereon, and an optical connector connected to the mounting board and optically coupled to the optical element, wherein the optical connector is provided on a surface, opposite to a surface on which the optical element is mounted, of the mounting board and the optical element is exposed.

In the above-mentioned photoelectric conversion/connection device further may comprise a motherboard having a main surface, and an electrical connector mounted on the main surface of the motherboard and capable of detachably connecting the mounting board (310) thereto.

Effect of the Invention

Inasmuch as an optical connector is provided on a surface, opposite to a surface where an optical element is mounted, of a mounting board and the optical element is exposed, it is possible to sufficiently ensure a heat dissipation measure for the optical element. Inasmuch as an electrical connector mounted on a main surface of a motherboard is capable of detachably connecting the mounting board thereto, it is possible to easily attach and detach the mounting board with respect to the motherboard.

Figure 1:
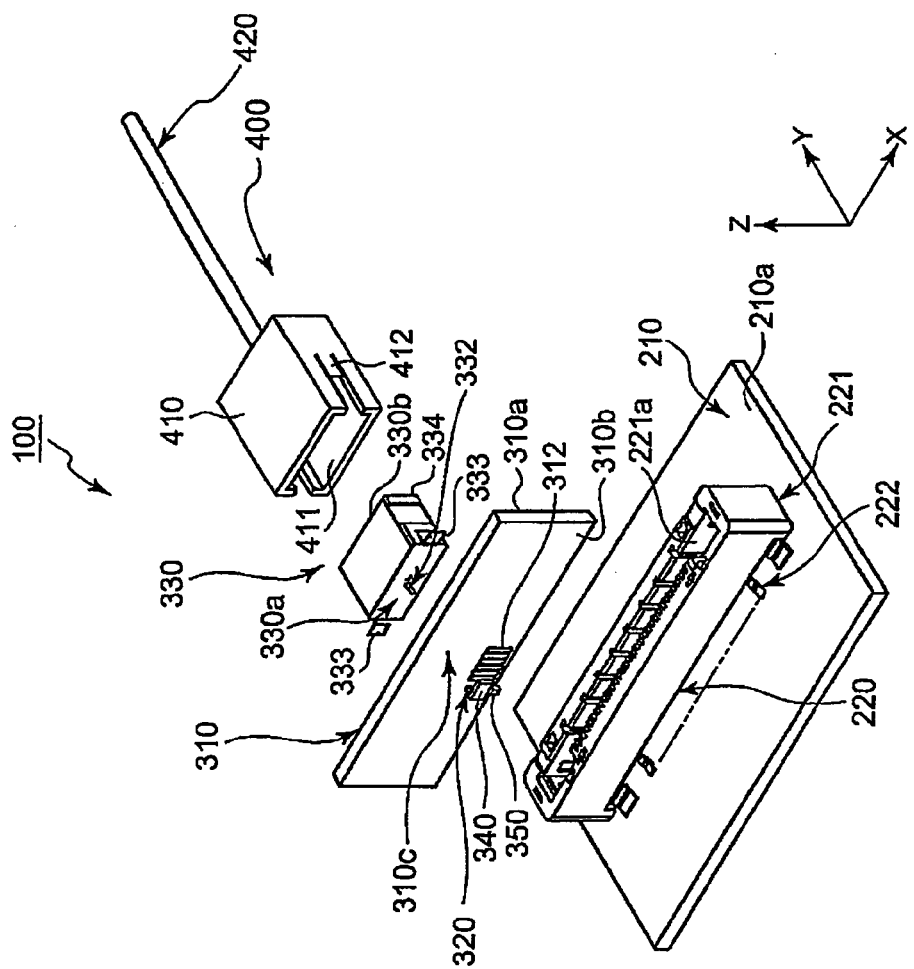
FIG. 1 is an exploded perspective view showing a photoelectric conversion/connection device according to a first embodiment of this invention.

DESCRIPTION OF SYMBOLS 100, 100A photoelectric conversion/connection device
200, 200A motherboard assembly
210 motherboard
210a main surface
220, 220A electrical connector
221 housing
221a fitting groove
222 contact
300 sub-board assembly
310 sub-board (mounting board)
310a first surface (first mounting surface)
310b second surface (second mounting surface)
310c hole
312 electrode
320 optical element
330 guide
330a one end portion
330b another end portion
330c both side surfaces
331 through hole
331a hole on one end side
331b hole (aligning portion) on another end side
332 first optical fiber (guide-side optical fiber)
332a protruding portion
333 terminal
334 projecting portion
340 driver
350 capacitor
400 optical connector
410 optical connector body
410a bottom portion
411 guide receiving portion
412 engaging claw
420 optical cable
421 second optical fiber (connector-side optical fiber)

BEST MODE FOR CARRYING OUT THE INVENTION

Hereinbelow, embodiments of this invention will be described in detail with reference to the drawings.

Figure 2:
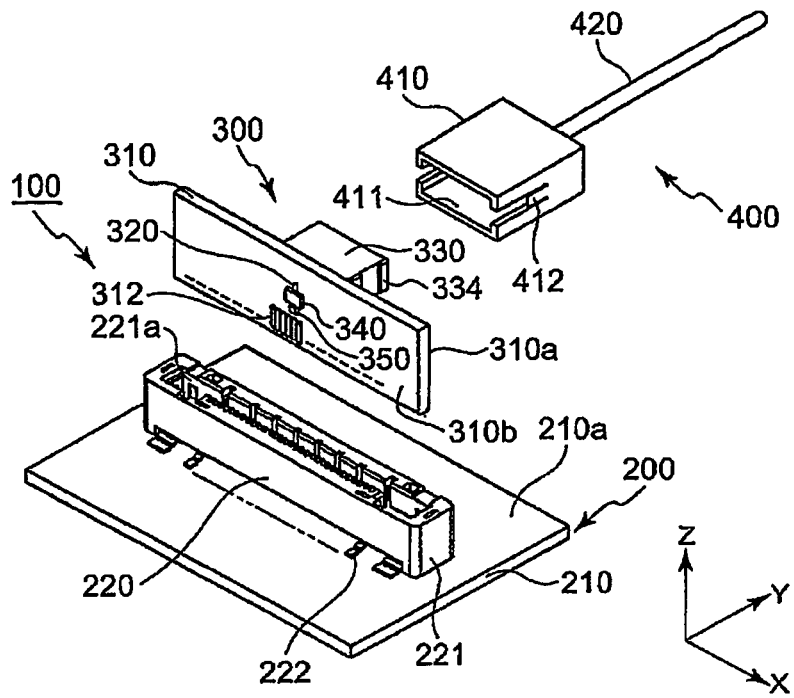
FIG. 2 is an exploded perspective view showing the photoelectric conversion/connection device, illustrated in FIG. 1, by disassembling it into respective components.
Figure 3:
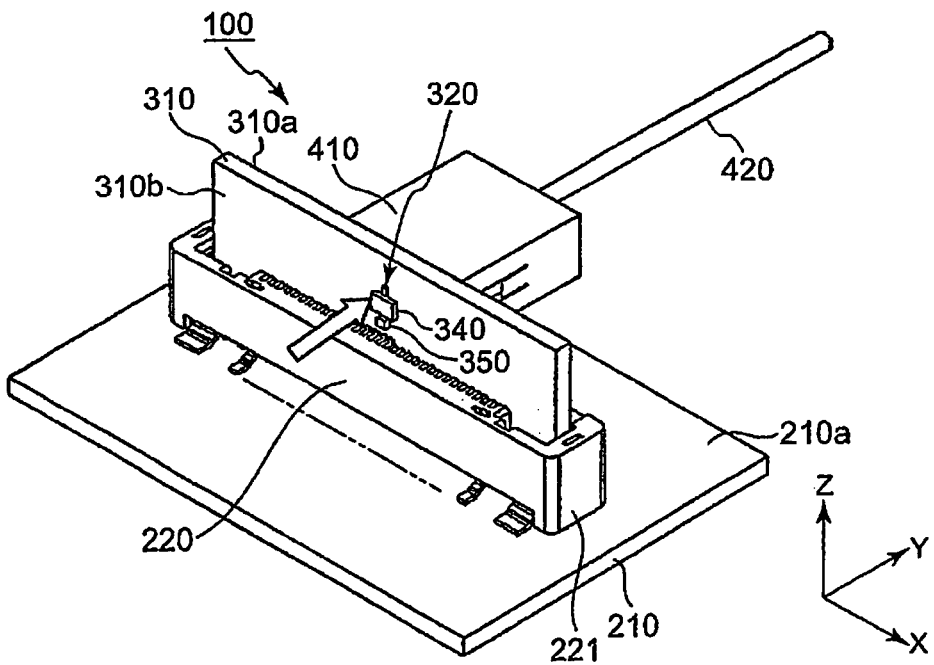
FIG. 3 is an assembled perspective view of the photoelectric conversion/connection device illustrated in FIG. 1.

Referring to FIGS. 1 to 3, description will proceed to a photoelectric conversion/connection device 100 according to the first embodiment of this invention. FIG. 1 is an exploded perspective view showing the photoelectric conversion/connection device 100. FIG. 2 is an exploded perspective view showing the photoelectric conversion/connection device 100 disassembled into respective components. FIG. 3 is an assembled perspective view of the photoelectric conversion/connection device 100.

In the illustrated example, a coordinate system has a first or X direction extending leftward and rightward, i.e. laterally, a second or Y direction extending forward and backward, and a third or Z direction extending upward and downward. The first to third directions X, Y, and Z are perpendicular to each other. The first or X direction is also called a lateral or width direction. The second or Y direction is also called a fore-and-aft direction. The third or Z direction is also called an up-and-down direction.

As shown in FIG. 2, the photoelectric conversion/connection device 100 comprises three components (constituent members), i.e. a motherboard assembly 200, a sub-board assembly 300, and an optical connector 400.

The motherboard assembly 200 comprises a motherboard 210 and an electrical connector 220. The motherboard 210 has a flat-plate shape extending parallel to an XY plane defined by the X and Y directions. The motherboard 210 has a main surface 210a mounted with the later-described electrical connector 220 thereon and formed with circuits (not illustrated) and patterns (not illustrated) thereon.

The electrical connector 220 is surface-mounted on the main surface 210a of the motherboard 210. The electrical connector 220 comprises a receptacle (socket) connector. The electrical connector 220 has a generally rectangular parallelepiped housing 221. The housing 221 has an elongated shape extending in the X direction. The housing 221 has a rectangular fitting groove 221a extending in the X direction. The fitting groove 221a is for insertion of an end portion of a sub-board 310 of the later-described sub-board assembly 300.

The illustrated electrical connector 220 is mounted on the main surface 210a of the motherboard 210 in an upright manner.

The housing 221 holds a plurality of contacts 222 in the fitting groove 221a. These contacts 222 are arranged at regular intervals in the X direction. Terminal portions, on the side facing the main surface 210a of the motherboard 210, of the contacts 222 are bent at 90 degrees as shown in FIG. 1.

The electrical connector 220 is fixed on the main surface 210a of the motherboard 210 by soldering the terminal portions of the contacts 222 to pads (not shown) formed on the main surface 210a of the motherboard 210. That is, the electrical connector 220 is surface-mounted on the main surface 210a of the motherboard 210, thereby forming the motherboard assembly 200. Such an electrical connector 220 is known in this technical field and is called a card edge connector.

The sub-board assembly 300 comprises the sub-board (mounting board) 310, optical elements 320, and a guide 330. The sub-board 310 has a flat-plate shape extending parallel to an XZ plane defined by the X and Z directions. The sub-board 310 extends in the X direction.

The sub-board 310 has a first surface (first mounting surface) 310a and a second surface (second mounting surface) 310b opposite to each other in a thickness direction (Y direction) thereof. The guide 330 is mounted on the first surface (first mounting surface) 310a as described later and the optical elements 320 are mounted on the second surface (second mounting surface) 310b as described later.

The sub-board 310 has a plurality of electrodes 312 on the second surface (second mounting surface) 310b at its end portion facing the electrical connector 220 located in the Z direction. These electrodes 312 are arranged at regular intervals in the X direction. It is to be noted that although only six electrodes 312 are shown in FIGS. 1 to 3, the electrodes 312 are actually provided at positions corresponding to the above contacts 222. In other words, the number of the electrodes 312 is equal to that of the contacts 222.

Therefore, when the end portion of the sub-board 310 is inserted (fitted) into the fitting groove 221a of the electrical connector 220, the plurality of electrodes 312 of the sub-board 310 are electrically connected to the corresponding contacts 222 of the electrical connector 220, respectively. Thus, the sub-board 310 is electrically connected to the motherboard 210 through the contacts 222 of the electrical connector 220.

The sub-board 310 has holes 310c each formed in the thickness direction (Y direction) thereof. Although only the single hole 310c is shown in FIG. 1, the sub-board 310 actually has four holes 310c in this example.

The guide 330 has one end portion 330a and another end portion 330b opposite to each other in the thickness direction (Y direction) of the sub-board (mounting board) 310. The guide 330 is mounted, at the one end portion 330a thereof, on the first surface (first mounting surface) 310a of the sub-board (mounting board) 310.

Figure 4:
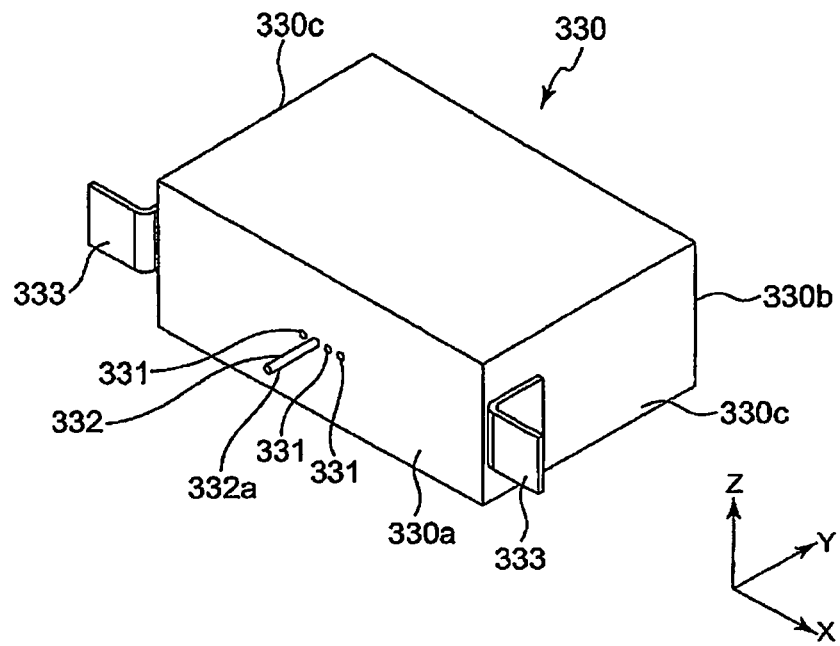
FIG. 4 is a perspective view showing a guide used in the photoelectric conversion/connection device illustrated in FIG. 1.
Figure 5:
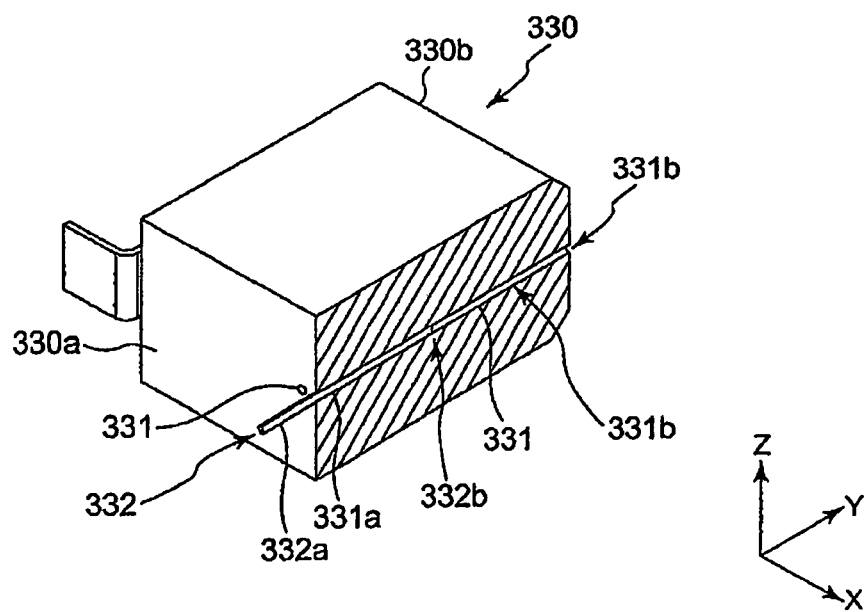
FIG. 5 is a perspective sectional view of the guide illustrated in FIG. 4.

FIG. 4 shows a perspective view of the guide 330 and FIG. 5 shows a perspective sectional view of the guide 330. FIGS. 4 and 5 omit illustration of a later-described pair of projecting portions. The guide 330 has four through holes 331 each extending in the thickness direction (Y direction) of the sub-board (mounting board) 310. Each through hole 331 is divided into a hole 331a on one end side and a hole 331b on the other end side. The guide 330 incorporates therein a first optical fiber 332 fixed in the hole 331a on the one end side of each through hole 331.

Although only the single first optical fiber 332 is shown in FIGS. 4 and 5, the guide 330 actually incorporates four first optical fibers 332 therein. The first optical fiber 332 is also called a guide-side optical fiber. Each first optical fiber (guide-side optical fiber) 332 has a protruding portion 332a protruding from the one end portion 330a by a length substantially equal to the thickness of the sub-board (mounting board) 310.

The diameter of each hole 310c formed in the sub-board (mounting board) 310 is slightly greater than the outer diameter of the first optical fiber (guide-side optical fiber) 332.

The guide 330 is mounted on the first surface (first mounting surface) 310a of the sub-board (mounting board) 310 in a state where the protruding portions 332a are inserted into the holes 310c of the sub-board (mounting board) 310.

Specifically, the guide 330 is attached with a pair of L-shaped terminals 333 on both side surfaces 330c, in the lateral direction (X direction), of the guide 330 on the one end portion 330a side. By soldering the pair of terminals 333 of the guide 330 to a pair of pads (not shown) formed on the first surface (first mounting surface) 310a of the sub-board (mounting board) 310, the guide 330 is fixed on the first surface (first mounting surface) 310a of the sub-board (mounting board) 310. That is, the pair of terminals 333 serve to surface-mount the guide 330 on the first surface (first mounting surface) 310a of the sub-board (mounting board) 310.

As shown in FIGS. 1 and 2, the guide 330 has a pair of projecting portions 334 on both side surfaces 330c, in the lateral direction (X direction), of the guide 330 on the other end portion 330b side. The pair of projecting portions 334 are for locking the later-described optical connector 400.

As shown in FIG. 5, the other end portion 332b of the first optical fiber (guide-side optical fiber) 332 extends only to the middle portion of the guide 330. A second optical fiber (connector-side optical fiber) fixed to the later-described optical connector 400 is inserted into the hole 331b on the other end side of each through hole 331. The diameter of each through hole 331 is slightly greater than the outer diameter of the second optical fiber (connector-side optical fiber). Accordingly, the hole 331b on the other end side of each through hole 331 serves as an aligning portion for aligning the first optical fiber (guide-side optical fiber) 332 fixed to the guide 330 and the second optical fiber (connector-side optical fiber) fixed to the optical connector 400. Herein, "aligning" represents substantially aligning optical axes of two optical parts (two optical fibers in this case) with each other.

The optical elements 320 are mounted on the second surface (second mounting surface) 310b of the sub-board (mounting board) 310 at positions of the holes 310c of the sub-board (mounting board) 310 so as to be optically coupled to the first optical fibers (guide-side optical fibers) 332, respectively.

Figure 6:
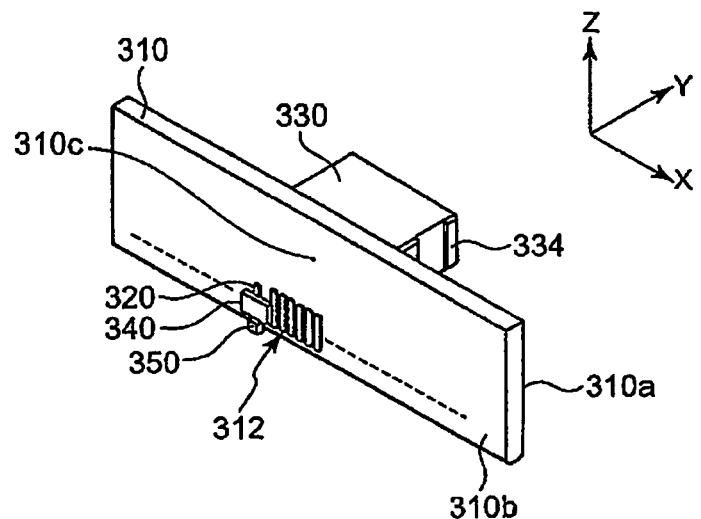
FIG. 6 is a perspective view showing a state where the guide is mounted on a first surface (first mounting surface) of a sub-board (mounting board)
Figure 7:
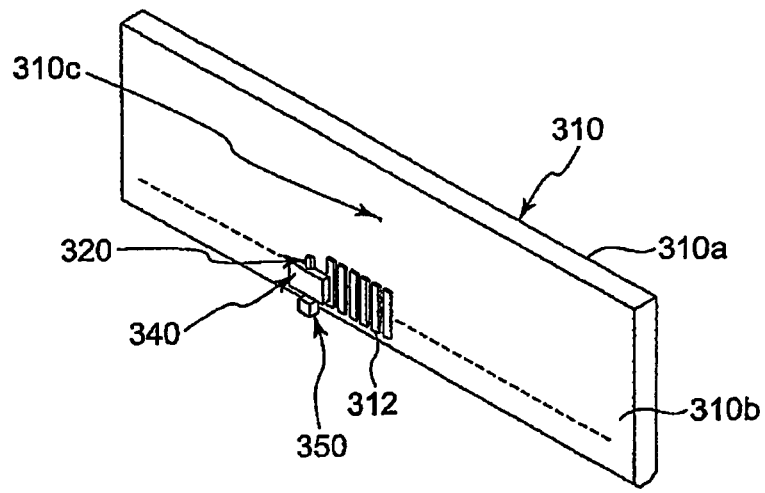
FIG. 7 is a perspective view showing a state before mounting an optical element on a second surface (second mounting surface) of the sub-board (mounting board)
Figure 8:
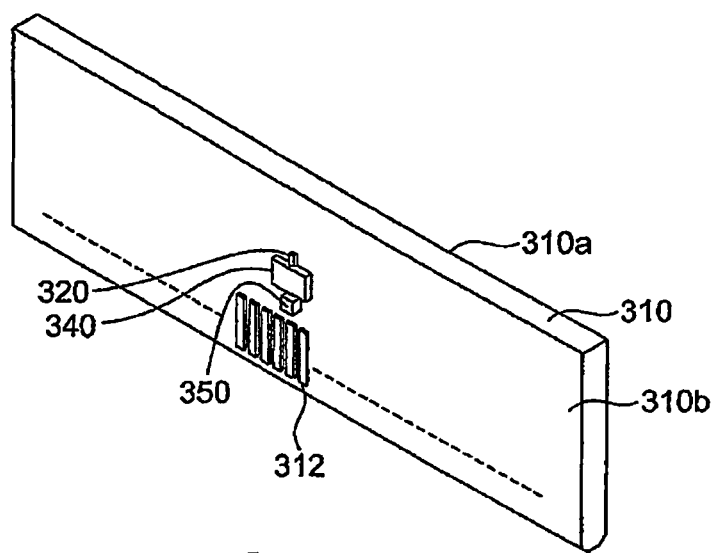
FIG. 8 is a perspective view showing a state after mounting the optical element on the second surface (second mounting surface) of the sub-board (mounting board)

Referring to FIGS. 6 to 8, a description will be given of the case where, after mounting the guide 330 on the first surface (first mounting surface) 310a of the sub-board (mounting board) 310 by inserting the protruding portions 332a of the first optical fibers (guide-side optical fibers) 332, fixed to the guide 330, into the holes 310c of the sub-board (mounting board) 310, the optical element 320 is mounted on the second surface (second mounting surface) 310b of the sub-board (mounting board) 310 while being aligned. FIG. 6 is a perspective view showing a state where the guide 330 is mounted on the first surface (first mounting surface) 310a of the sub-board (mounting board) 310. FIG. 7 is a perspective view showing a state before mounting the optical element 320 on the second surface (second mounting surface) 310b of the sub-board (mounting board) 310 and FIG. 8 is a perspective view showing a state after mounting the optical element 320 on the second surface (second mounting surface) 310b of the sub-board (mounting board) 310.

The optical element 320 may be a light-emitting element such as a laser diode (LD) or a light-receiving element such as a photodiode (PD). A driver 340 for driving the optical element 320, a capacitor 350, and so on are mounted on the second surface (second mounting surface) 310b of the sub-board (mounting board) 310.

When the optical element 320 comprises a light-emitting element, an optical power meter is connected to an end portion of an optical cable of the optical connector 400 connected to the guide 330 as described later. On the other hand, when the optical element 320 comprises a light-receiving element, a light source is connected to an end portion of an optical cable of the optical connector 400 connected to the guide 330.

It will be assumed that the optical element 320 comprises a light-emitting element. In this case, by driving the light-emitting element 320, a laser beam emitted from the light-emitting element 320 passes through the first optical fiber 322 (guide-side optical fiber) of the guide 330 and the second optical fiber (connector-side optical fiber) of the optical connector 400 so that the quantity of light is measured by the optical power meter. At a position where the quantity of light measured by the optical power meter becomes maximum, the optical element (light-emitting element) 320 is fixed on the second surface (second mounting surface) 310b of the sub-board (mounting board) 310 by soldering, an adhesive, or the like.

It will be assumed that the optical element 320 comprises a light-receiving element. In this case, a laser beam emitted from the above-mentioned light source passes through the second optical fiber (connector-side optical fiber) of the optical connector 400 and the first optical fiber 322 (guide-side optical fiber) of the guide 330 and is received by the light-receiving element 320. The coupling loss or the like in the amount of received light at the light-receiving element 320 is detected by a detector (not illustrated). At a position where the loss is small, the optical element (light-receiving element) 320 is fixed on the second surface (second mounting surface) 310b of the sub-board (mounting board) 310 by an adhesive or the like.

In this manner, the optical element 320 is mounted on the second surface (second mounting surface) 310b of the sub-board (mounting board) 310 while being aligned. That is, it is possible to substantially align the optical axis of the optical element 320 and the optical axis of the first optical fiber (guide-side optical fiber) 332 with each other.

Figure 9:
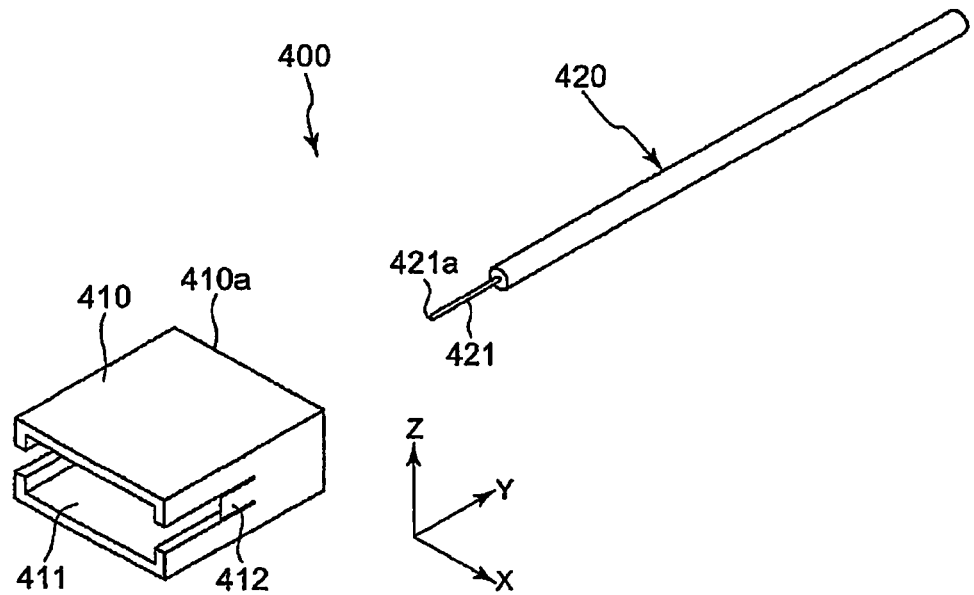
FIG. 9 is an exploded perspective view of an optical connector used in the photoelectric conversion/connection device shown in FIG. 1.
Figure 10:
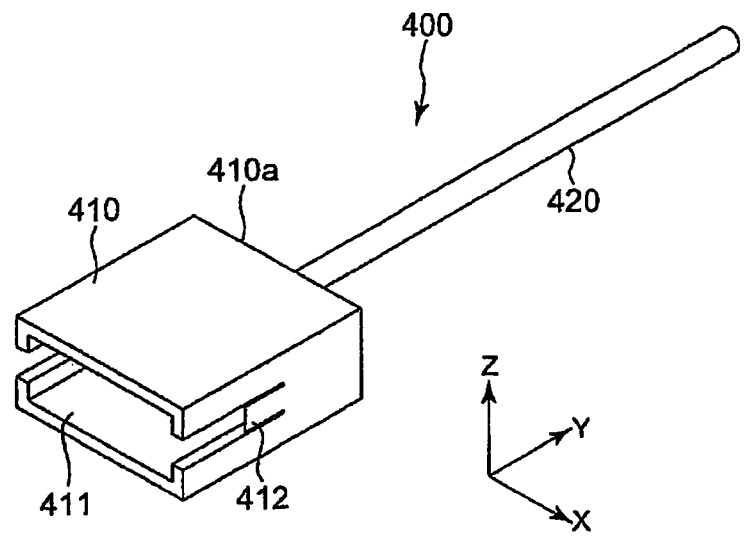
FIG. 10 is an assembled perspective view of the optical connector illustrated in FIG. 9.

Referring to FIGS. 9 and 10, the structure of the optical connector 400 will be described. FIG. 9 is an exploded perspective view of the optical connector 400 and FIG. 10 is an assembled perspective view of the optical connector 400.

The optical connector 400 comprises an optical connector body 410 and an optical cable 420. The optical connector body 410 has a generally rectangular parallelepiped external shape. The optical connector body 410 has a guide receiving portion 411 for receiving the guide 330 therein. Further, the optical connector body 410 has, at its both side walls in the X direction, a pair of engaging claws 412 that engage with the pair of projecting portions 334 of the guide 330. Anyway, the optical connector body 410 comprises a socket-type connector.

A through hole (not shown) into which the optical cable 420 is inserted is provided at a bottom portion 410a of the optical connector body 410. The optical cable 420 extends in the Y direction and includes second optical fibers (connector-side optical fiber) 421. Although only the single second optical fiber (connector-side optical fiber) 421 is shown in FIG. 9, the optical cable 420 actually includes four second optical fibers (connector-side optical fibers) in this example.

The amount of protrusion of the second optical fiber (connector-side optical fiber) 421 from the optical cable 410 is substantially equal to the length of the hole 331b on the other end side of the through hole 331 (i.e. the aligning portion) formed in the guide 330 (see FIG. 5).

Figure 11:
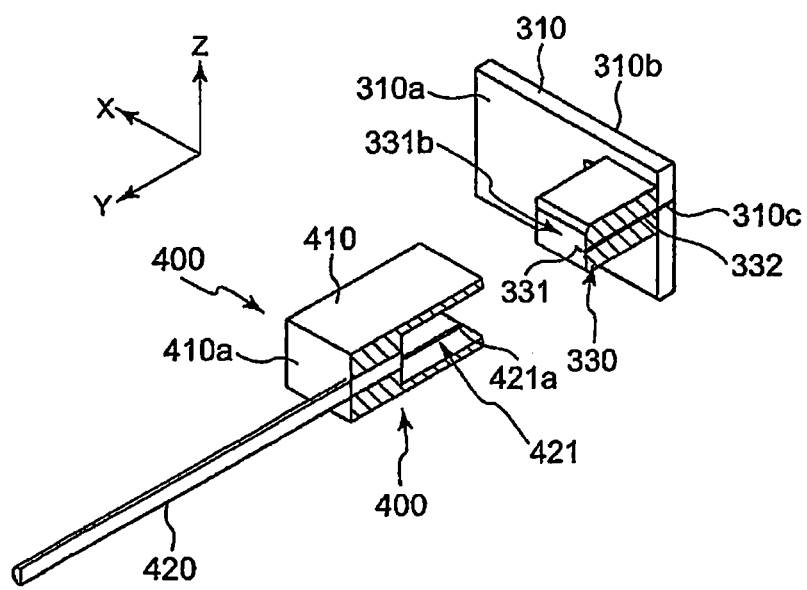
FIG. 11 is a perspective sectional view showing a state after mounting the guide on the sub-board (mounting board), together with the optical connector.
Figure 12:
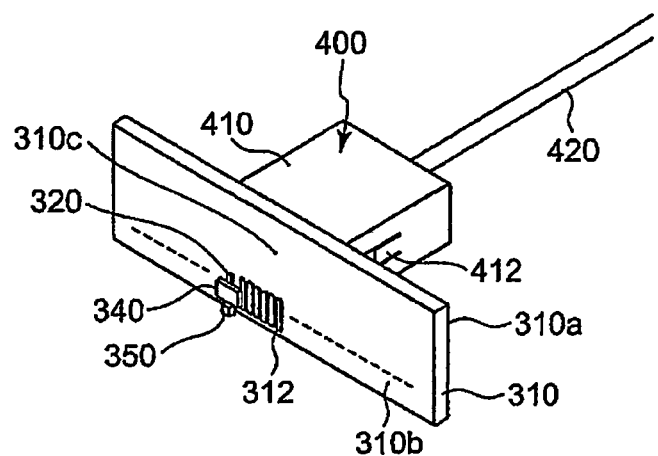
FIG. 12 is a perspective view showing a state where the optical connector is connected to the guide.
Figure 13:
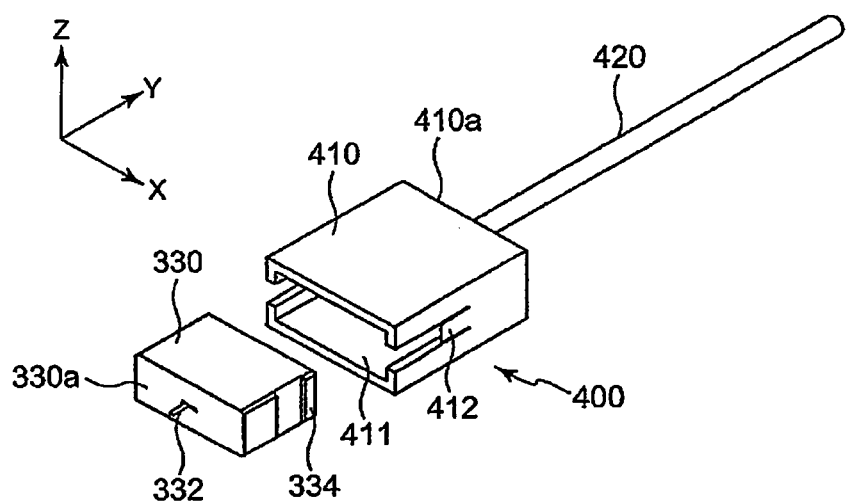
FIG. 13 is a perspective view showing a state before connecting the optical connector to the guide.
Figure 14:
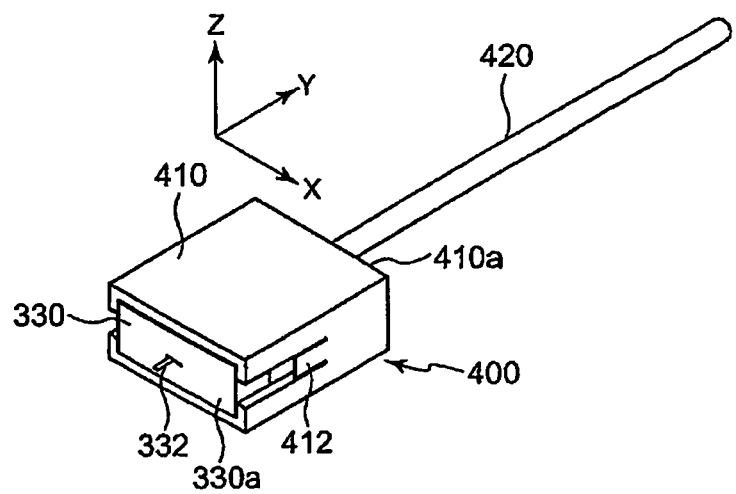
FIG. 14 is a perspective view showing a state after connecting the optical connector to the guide.
Figure 15:
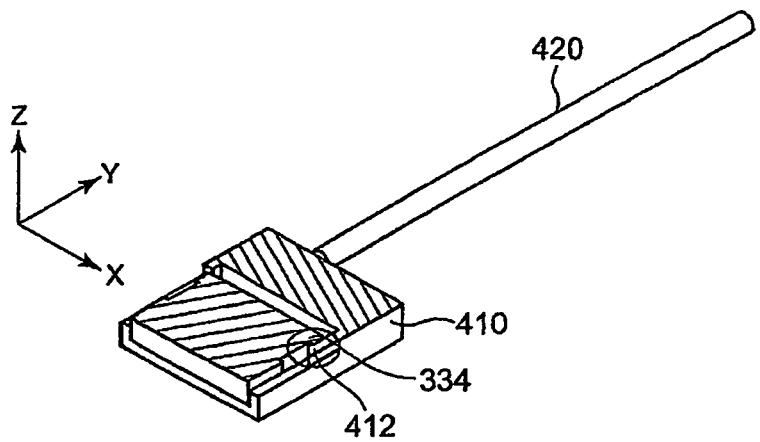
FIG. 15 is a perspective sectional view of FIG. 14.

Referring to FIGS. 11 to 15, a description will be given of the case of connecting the optical connector 400 to the guide 330. FIG. 11 is a perspective sectional view showing a state after mounting the guide 330 on the sub-board (mounting board) 310, together with the optical connector. FIG. 12 is a perspective view showing a state where the optical connector 400 is connected to the guide 330. FIG. 13 is a perspective view showing a state before connecting the optical connector 400 to the guide 330 and FIG. 14 is a perspective view showing a state after connecting the optical connector 400 to the guide 330. FIG. 15 is a perspective sectional view of FIG. 14. FIGS. 13 to 15 omit illustration of the pair of terminals 333 (FIG. 4) attached to both side surfaces 330c of the guide 330.

As shown in FIG. 11, the second optical fibers 421 are fixed to the optical connector 400 through the optical cable 420. On the other hand, the first optical fibers 332 are fixed to the guide 330. The optical connector 400 is connected to the guide 330 in a state where the second optical fibers 421 are inserted into the aligning portions 331b of the guide 330. In this event, the tips 421a (FIG. 9) of the second optical fibers (connector-side optical fibers) 421 butt against the other end portions 332b (FIG. 5) of the first optical fibers (guide-side optical fibers) 332.

Further, in this event, as shown in FIG. 15, the pair of engaging claws 412 of the optical connector body 410 engage with the pair of projecting portions 334 of the guide 330 so that the optical connector 400 is locked to the guide 330.

In this embodiment, the second optical fibers 421 are fixed to the optical connector 400 by fixing the optical cable 420 to the optical connector body 410. However, the second optical fibers 421 may be fixed to the optical connector 400 by directly fixing the second optical fibers 421 to the optical connector body 410.

In the photoelectric conversion/connection device 100 according to the first embodiment of this invention described above, inasmuch as the optical elements 320 are exposed as shown in FIG. 3, the heat generated in the optical elements 320 can be dissipated to the outside. Further, as indicated by a big arrow in FIG. 3, inasmuch as a member excellent in thermal conductivity (e.g. aluminum) can be directly attached to the optical elements 320, it is possible to improve the heat dissipation of the optical elements 320. Inasmuch as each optical element 320 is directly aligned with the medium (first optical fiber 332), there is also an advantage in that even if the accuracy of members of the respective optical elements 320 is poor, it is possible to fabricate the photoelectric conversion/connection device 100. Further, as shown in FIG. 2, inasmuch as the photoelectric conversion/connection device 100 is composed of the three components (constituent members), i.e. the motherboard assembly 200, the sub-board assembly 300, and the optical connector 400, when there is a problem (damage, failure, degradation) in the individual components (constituent members), it is possible to easily replace them. Inasmuch as the electrical connector 220 mounted on the main surface 210a of the motherboard 210 is capable of detachably connecting the sub-board (mounting board) 310 thereto, it is possible to easily attach and detach the sub-board (mounting board) 310 with respect to the motherboard 210.

Figure 16:
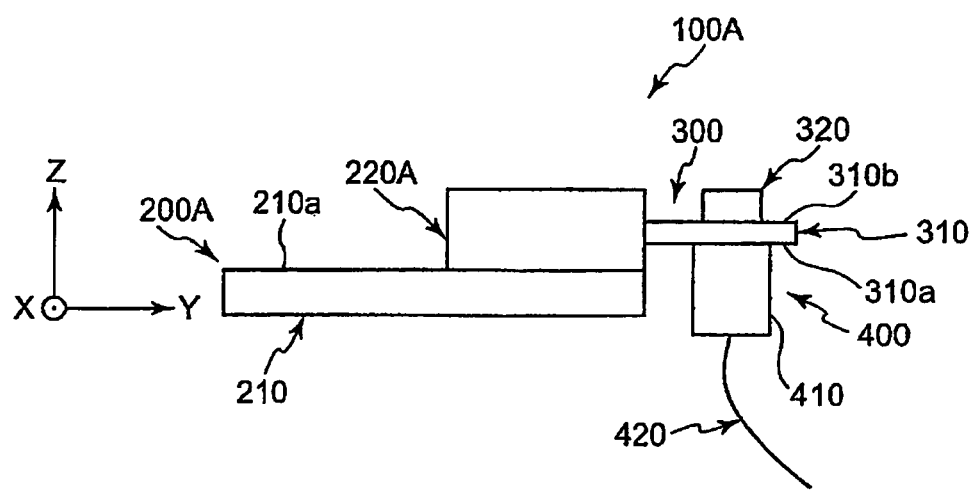
FIG. 16 is a schematic side view showing a photoelectric conversion/connection device according to a second embodiment of this invention.

Referring to FIG. 16, the description will proceed to a photoelectric conversion/connection device 100A according to the second embodiment of this invention. FIG. 16 is a schematic side view showing the photoelectric conversion/connection device 100A.

Also in the illustrated example, a coordinate system has a first or X direction extending leftward and rightward, i.e. laterally, a second or Y direction extending forward and backward, and a third or Z direction extending upward and downward.

The illustrated photoelectric conversion/connection device 100A has the same structure as the photoelectric conversion/connection device 100 according to the first embodiment of this invention described above, except that the structure of a motherboard assembly is modified as described later. In view of this, a reference symbol of 200A is assigned to the motherboard assembly. The same reference symbols are assigned to components having the same functions as those of the photoelectric conversion/connection device 100 described above.

The motherboard assembly 200A has the same structure as the motherboard assembly 200 except that an electrical connector is modified as described later. In view of this, a reference symbol of 220A is assigned to the electrical connector.

The electrical connector 220 of the first embodiment is mounted on the main surface 210a of the motherboard 210 in a standing manner in the perpendicular direction (un-and-down direction) Z, while, the electrical connector 220A of the second embodiment is mounted on a main surface 210a of a motherboard 210 in a lay-down manner in the horizontal direction. In other words, the electrical connector 220 is mounted on the main surface 210a of the motherboard 210 in an upright manner, while, the electrical connector 220A is mounted on the main surface 210a of the motherboard 210 in a transverse manner.

Therefore, in the electrical connector 220, the fitting groove 221a is open at its upper portion along the up-and-down direction Z, while, in the electrical connector 220A, its fitting groove (not illustrated) is open at its back portion (rear portion) along the fore-and-aft direction Y.

In the photoelectric conversion/connection device 100, the sub-board 310 is connected to the electrical connector 220 so as to extend in a direction (vertical direction) perpendicular to a direction (horizontal direction) in which the motherboard 210 extends, while, in the photoelectric conversion/connection device 100A, a sub-board 310 is connected to the electrical connector 220A so as to extend in a direction (horizontal direction) parallel to a direction (horizontal direction) in which the motherboard 210 extends.

In the photoelectric conversion/connection device 100A, a first surface (first mounting surface) 310a of the sub-board 310 becomes a lower surface and a second surface (second mounting surface) 310b thereof becomes an upper surface. Therefore, as shown in FIG. 16, optical elements 320 are mounted on the second surface 310b being the upper surface of the sub-board 310.

Also in the photoelectric conversion/connection device 100A according to the second embodiment of this invention, inasmuch as the optical elements 320 are exposed, the heat generated in the optical elements 320 can be dissipated to the outside. Further, inasmuch as a member excellent in thermal conductivity (e.g. aluminum) can be directly attached to the optical elements 320, it is possible to improve the heat dissipation of the optical elements 320. Inasmuch as each optical element 320 is directly aligned with a medium (first optical fiber 332), there is also an advantage in that even if the accuracy of members of the respective optical elements 320 is poor, it is possible to fabricate the photoelectric conversion/connection device 100A. Further, inasmuch as the photoelectric conversion/connection device 100A is composed of three components (constituent members), i.e. the motherboard assembly 200A, a sub-board assembly 300, and an optical connector 400, when there is a problem (damage, failure, degradation) in the individual components (constituent members), it is possible to easily replace them. Inasmuch as the electrical connector 220A mounted on the main surface 210a of the motherboard 210 is capable of detachably connecting the sub-board (mounting board) 310 thereto, it is possible to easily attach and detach the sub-board (mounting board) 310 with respect to the motherboard 210.

In the photoelectric conversion/connection device 100, 100A according to this invention described above, the mounting board 310 may have the first surface 310a and the second surface 310b opposite to each other in the thickness direction of the mounting board 310 and may have the hole 310c formed in the thickness direction of the mounting board 310. In this case, the photoelectric conversion/connection device 100, 100A is preferably provided with the guide 330 that is mounted, at its one end portion 330a, on the first surface 310a of the mounting board 310 and is connectable to the optical connector 400 on the other end portion 330b side. The guide 330 has the through hole 331 extending in the thickness direction of the mounting board 310. The guide 330 incorporates therein the guide-side optical fiber 332 fixed in the through hole 331. The guide-side optical fiber 332 has the protruding portion 332a protruding from the one end portion 330a by the length substantially equal to the thickness of the mounting board 310. The protruding portion 332a is inserted into the hole 310c of the mounting board 310. The optical element 320 is mounted on the second surface 310b of the mounting board 310 at the position of the hole 310c of the mounting board 310 so as to be optically coupled to the guide-side optical fiber 332. The optical connector 400 may include the connector-side optical fiber 421 fixed to the optical connector 400 so as to be optically coupled to the guide-side optical fiber 332. The guide 330 preferably has, on the other end portion 330b side, the aligning portion 331b for connecting the guide-side optical fiber 332 and the connector-side optical fiber 421 to each other. The connector-side optical fiber 421 may be inserted into the through hole 331 of the guide 330 and the aligning portion 331b may be the through hole 331 of the guide 330.

The photoelectric conversion/connection device 100, 100A according to this invention described above may further comprise the motherboard 210 having the main surface 210a and the electrical connector 220, 220A mounted on the main surface of the motherboard and capable of detachably connecting the mounting board 310 thereto. In this case, the mounting board 310 may be connected to the electrical connector 220 so as to extend in the direction perpendicular to the extending direction of the motherboard 210 or may be connected to the electrical connector 220A so as to extend in the direction parallel to the extending direction of the motherboard 210.

While the present invention has been described with reference to the embodiments thereof, the present invention is not limited to the above embodiments. It will be understood by those of ordinary skill in the art that various changes in structure and details may be made without departing from the scope of the present invention. For example, although the sub-board (mounting board) 310 is formed with the four holes 310c in the above embodiments, the number of the holes 310c is not limited to four, but may be any number equal to or greater than one. Likewise, although the guide 330 is formed with the four through holes 331 in the above embodiments, the number of the through holes 331 is also not limited to four, but may be any number equal to or greater than one.

The invention claimed is:

1. A photoelectric conversion/connection device comprising:
   an optical element;
   a mounting board mounted with said optical element thereon; and
   an optical connector connected to said mounting board and optically coupled to said optical element, wherein:
   said optical connector is provided on a surface, opposite to a surface on which said optical element is mounted, of said mounting board and said optical element is exposed, wherein:
   said mounting board has the first surface and the second surface opposite to each other in a thickness direction thereof and has a first through hole formed in the thickness direction of said mounting board;
   wherein said photoelectric conversion/connection device comprises a guide mounted, at its one end portion, on said first surface of said mounting board and connectable to said optical connector on its other end portion side, said guide having a second through hole extending in the thickness direction of said mounting board, said guide incorporating therein a guide-side optical fiber fixed in said second through hole, said first through hole having a diameter which is slightly greater than an outer diameter of said guide-side optical fiber, said guide-side optical fiber having a protruding portion protruding from said one end portion by a length substantially equal to a thickness of said mounting board, and said protruding portion being inserted into said first through hole of said mounting board without any member therebetween; and
   wherein said optical element is mounted on said second surface of said mounting board at a position of said first through hole of said mounting board so as to be optically coupled to said guide-side optical fiber.

2. The photoelectric conversion/connection device according to claim 1, wherein said optical connector includes a connector-side optical fiber fixed to said optical connector so as to be optically coupled to said guide-side optical fiber.

3. The photoelectric conversion/connection device according to claim 2, wherein said guide has, on said other end portion side, an aligning portion for connecting said guide-side optical fiber and said connector-side optical fiber to each other.

4. The photoelectric conversion/connection device according to claim 3, wherein said connector-side optical fiber is inserted into said second through hole of said guide and said aligning portion is said second through hole of said guide.

5. The photoelectric conversion/connection device according to claim 1, further comprising:
   a motherboard having a main surface; and
   an electrical connector mounted on the main surface of said motherboard and detachably connectable to said mounting board.

6. The photoelectric conversion/connection device according to claim 5, wherein said mounting board is connected to said electrical connector so as to extend in a direction perpendicular to an extending direction of said motherboard.

7. The photoelectric conversion/connection device according to claim 5, wherein said mounting board is connected to said electrical connector so as to extend in a direction parallel to an extending direction of said motherboard.

8. A photoelectric conversion/connection device comprising:
   a motherboard having a main surface;
   an electrical connector mounted on the main surface of said motherboard;
   a sub-board detachably connectable to said electrical connector, said sub-board having a first mounting surface and a second mounting surface opposite to each other in a thickness direction of said sub-board, said sub-board having a first through hole formed in the thickness direction of said sub-board, and said sub-board being connected to said electrical connector so as to extend in a direction perpendicular to an extending direction of said motherboard;
   a guide mounted on said first mounting surface of said sub-board, said guide incorporating therein a first optical fiber extending in the thickness direction of said sub-board, said first through hole having a diameter which is slightly greater than an outer diameter of said first optical fiber, wherein said first optical fiber has a protruding portion protruding from one end portion of said guide by a length substantially equal to a thickness of said sub-board, and said protruding portion of said first optical fiber is inserted into said first through hole of said sub-board without any member therebetween;
   an optical element mounted on said second mounting surface of said sub-board at a position of said first through hole of said sub-board so as to be optically coupled to said first optical fiber; and an optical connector connectable to said guide at its other end portion, said optical connector including a second optical fiber fixed to said optical connector so as to be optically coupled to said first optical fiber.

9. The photoelectric conversion/connection device according to claim 8, wherein said guide has, on its other end portion side, an aligning portion for connecting said first optical fiber and said second optical fiber to each other.

10. A photoelectric conversion/connection device comprising:
   a motherboard having a main surface;
   an electrical connector mounted on the main surface of said motherboard;
   a sub-board detachably connectable to said electrical connector, said sub-board having a first mounting surface and a second mounting surface opposite to each other in a thickness direction of said sub-board, said sub-board having a first through hole formed in the thickness direction of said sub-board, and said sub-board being connected to said electrical connector so as to extend in a direction parallel to an extending direction of said motherboard;
   a guide mounted on said first mounting surface of said sub-board, said guide incorporating therein a first optical fiber extending in the thickness direction of said sub-board, said first through hole having a diameter which is slightly greater than an outer diameter of said first optical fiber, wherein said first optical fiber has a protruding portion protruding from one end portion of said guide by a length substantially equal to a thickness of said sub-board, and said protruding portion of said first optical fiber is inserted into said first through hole of said sub-board without any member therebetween;
   an optical element mounted on said second mounting surface of said sub-board at a position of said first through hole of said sub-board so as to be optically coupled to said first optical fiber; and
   an optical connector connectable to said guide at its other end portion, said optical connector including a second optical fiber fixed to said optical connector so as to be optically coupled to said first optical fiber.

11. The photoelectric conversion/connection device according to claim 10, wherein said guide has, on its other end portion side, an aligning portion for connecting said first optical fiber and said second optical fiber to each other.

* * * * *